S. B. STORER.
RECORDING INSTRUMENT FOR WATTMETERS.
APPLICATION FILED OCT. 3, 1906.
1,141,729.
Patented June 1, 1915.
2 SHEETS—SHEET 1.
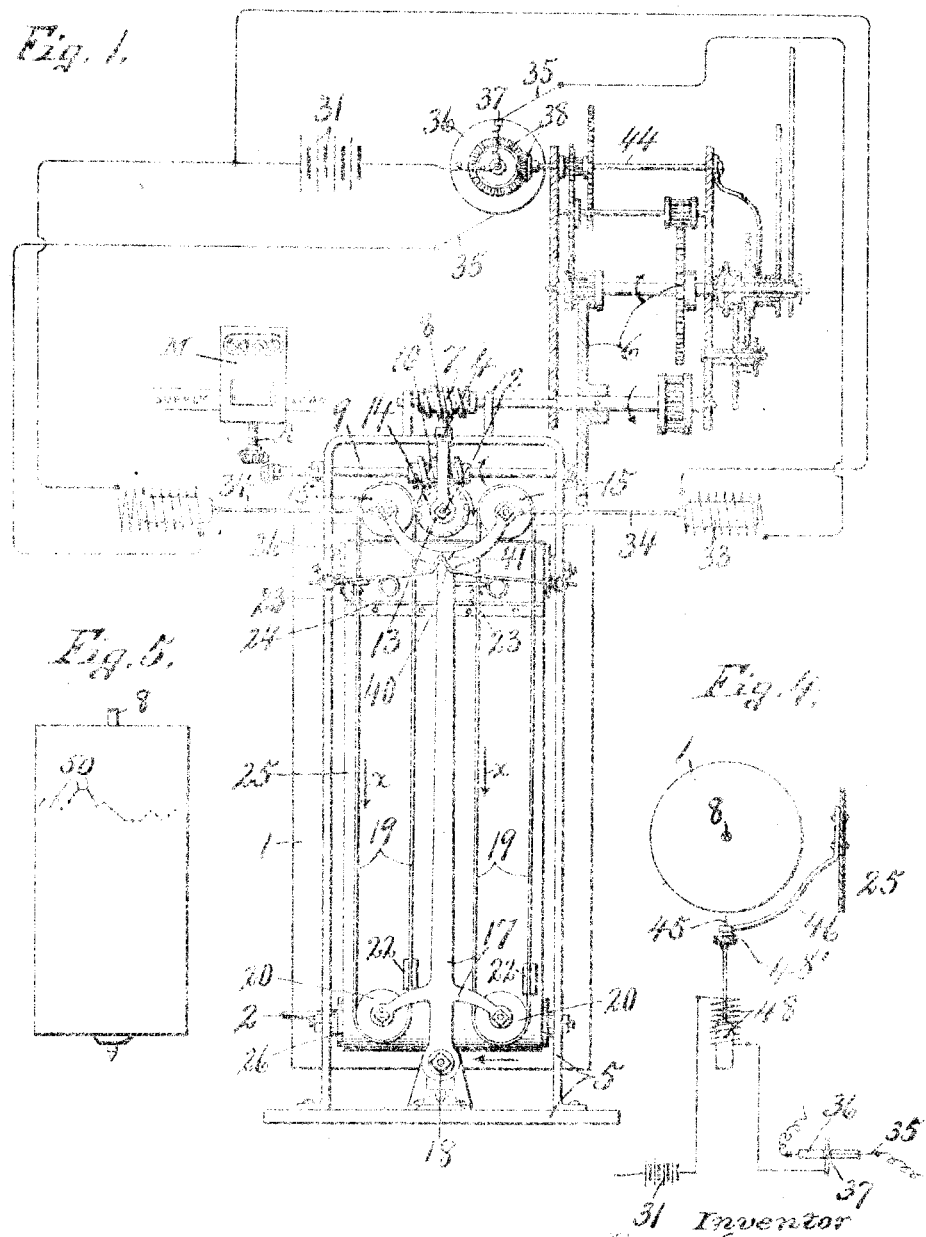

S. B. STORER.
RECORDING INSTRUMENT FOR WATTMETERS.
APPLICATION FILED OCT. 5, 1908.
1,141,729.
Patented June 1, 1915.
2 SHEETS—SHEET 2.
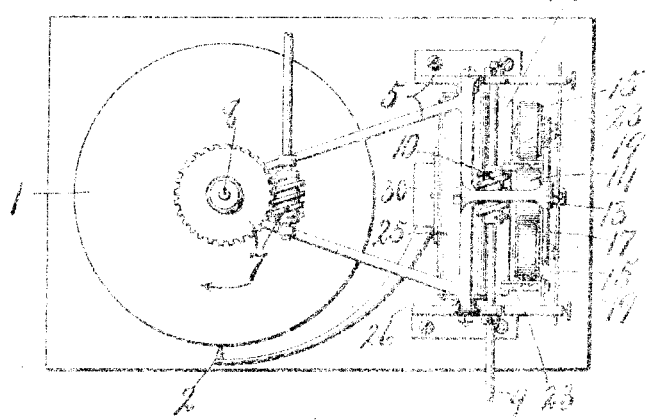
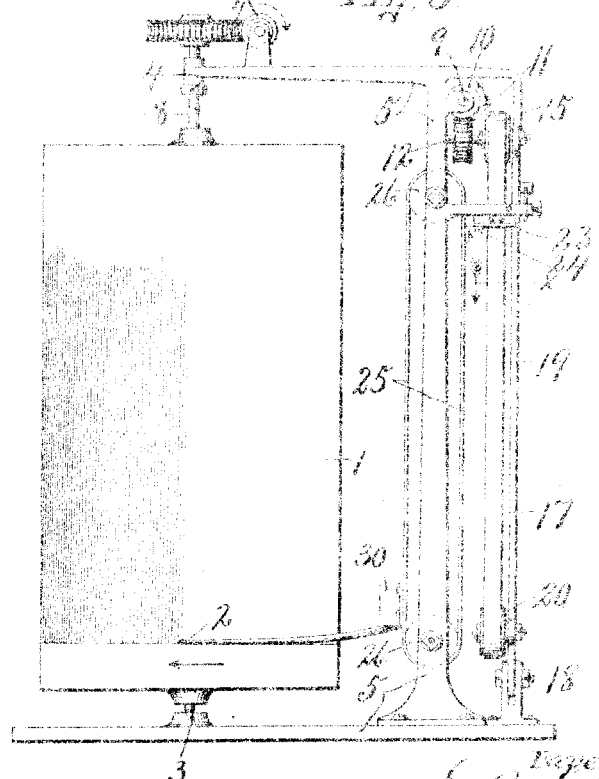

UNITED STATES PATENT OFFICE.

SIMON B. STORER, OF SYRACUSE, NEW YORK, ASSIGNOR, BY MESNE ASSIGNMENTS, TO CHICAGO ELECTRIC METER COMPANY, OF CHICAGO, ILLINOIS, A CORPORATION OF ILLINOIS.

RECORDING INSTRUMENT FOR WATTMETERS.

1,141,729.  Specification of Letters Patent.  Patented June 1, 1915.

Application filed October 3, 1906. Serial No. 337,315.

*To all whom it may concern:*

Be it known that I, SIMON B. STORER, of Syracuse, in the county of Onondago, in the State of New York, have invented new and useful Improvements in Recording Instruments for Wattmeters, of which the following, taken in connection with the accompanying drawings, is a full, clear, and exact description.

This invention relates to certain improvements in recording instruments for wattmeters, in which the record or reading sought is derived from or dependent upon the speed of a revolving element.

The broad object is to automatically make a graphic record of the number of revolutions or average speeds of a revolving element at regular periods during predetermined intervals of time.

The specific object is to make graphic records of the average rate of consumption of electric energy during predetermined periods of time, as for instance, each minute during a longer interval, as one day or week so that during such interval a series of records will have been made showing the average speeds or the number of revolutions of the revolving part during the predetermined periods of time, and when used in connection with the revolving part of a watt meter gives an exact record of the average rate of consumption of electric energy, or kilowatt hours, during such periods and interval of time, as distinguished from the ordinary line drawing of a recording watt meter which indicates momentary fluctuations and instantaneous values in load. In other words, I have sought to provide an instrument operated by one of the revolving parts of a watt meter or other instrument to record the average or relative speeds or rate of consumption of electric energy for regular periods of a predetermined interval of time.

Other objects relating to the specific structure of my invention will be brought out in the following description.

In the drawings—

Figure 1 is an elevation of my improved recording instrument showing the electrical connections diagrammatically. Figs. 2 and 3 are respectively top plan and side elevation of the device seen in Fig. 1, omitting the clock mechanism and electrical connections. Fig. 4 is an end view of the record cylinder showing a modified recording device by which an impression is made upon the record sheet at the end of each interval of time instead of by a line, as shown in Figs. 1, 2 and 3. Fig. 5 is a side view of the cylinder shown in Fig. 4, showing the record produced thereby.

The device shown in Figs. 1 to 3 inclusive is especially adapted for use in connection with a revolving element, as —A—, of an integrating watt meter —M—, and comprises essentially a clock rotated record cylinder —1—; an impression making device, as a marker —2— movable back and forth at regular predetermined intervals along the record cylinder —1— and adapted to make impressions thereon, and suitable mechanism actuated by the revolving element —A— for actuating the marker —2—.

The record cylinder —1— is preferably mounted on a vertical axis having its lower end stepped in a suitable bearing —3— and its upper end journaled in a bearing —4— of a frame —5—.

Rotary motion is imparted to the cylinder —1— through the medium of any suitable chronometer, as a clock train —6— and worm gears —7— connecting said clock train to the upper end of a shaft or spindle —8— of the record cylinder. The movement of the record cylinder is, therefore, synchronized with the chronometer to make one complete revolution in a given period, as in this instance, one calendar week of time.

The recording finger —2— is normally in a certain position relatively to and preferably near the lower end of the cylinder —1— and is moved upwardly along the cylinder with the same or varying degrees of speed, according to the speed of operation of the rotary meter element —A—, such movement continuing through a predetermined interval, as in this instance, one minute of time so that if the speed of the driving element —A— varies, the degree of upward movement of the finger —2— during each minute interval of time will correspondingly vary. In other words, if the average speed of the driving element —A— for a given period, as one minute of time is greater than that for any other same period of time the recording finger —2— will be moved upwardly a greater distance, or make an impression upon the record cylinder at a greater height than that recorded for the slower average speed.

Any suitable mechanism may therefore, be employed for transmitting motion from the driving element —A— to the recording finger —2— in combination with any other suitable chronometer controlled mechanism for limiting the movement of the recording finger to regular predetermined periods of time, in this instance, one minute.

As shown in the drawings, rotary motion is transmitted from the driving element —A— to a shaft —9— having a worm —10— which meshes with a gear —11— on a shaft —12—, the latter being journaled in fixed bearings —13— and is provided with a friction roller —14— rigid thereon.

A pair of additional rollers 15— and 15— are mounted upon parallel shafts at diametrically opposite sides of the roller —14— and are preferably supported upon the upper end of an oscillatory frame —17— having its lower end fulcrumed at —18— upon the base of the frame —5— near the plane of the lower end of the cylinder —1—, said rollers 15— and —15— being spaced apart a distance somewhat greater than the diameter of the friction roller —14— and are adapted to be moved at regular predetermined intervals of in this instance, one minute, into and out of frictional engagement with opposite faces of the roller —14—. These rollers 15— and 15— are connected by belts —19— to additional rollers —20— which are mounted upon the lower end of the oscillatory frame —17— near the bottom of the cylinder —1—. By mounting both sets of rollers —15— and —20— upon the same oscillatory frame —17— a uniform tension is maintained upon the belts —19—. The portions of the belts —19— passing around the rollers —15— in this instance come in direct contact with the continuously rotating driving roller —14— as the frame —17— is oscillated, first, in one direction and then in the opposite direction so that when one belt or roller —15— is in contact with one side of the driving roller —14—, said belt is actuated in the direction indicated by arrow —x—, against the action of a counterweight —22—, the speed of the movement depending upon the speed of rotation of the main driving element —A— and intervening worm gear connections —10— and —11—. This movement of the belt —19— continues through a predetermined period of in this instance, one minute, at the end of which period the frame —17— is oscillated to throw the other roller —15— and its belt —19— into frictional engagement with the driving roller 14—, thereby releasing the first named belt and allowing it to automatically return to its starting position through the medium of its counterweight —22—, it being understood that the belt which has just been released has the full period of one minute in which to return to its starting position while the other belt is being actuated in the direction indicated by arrow —x— by the driving roller 14— against its counterweight —22—.

The side of each belt 19— which is moved downwardly by the action of the driving element 14— is provided with a shoulder —23— which projects inwardly and engages a ledge —24— on the belt —25—, which latter is mounted upon suitable rollers —26— having parallel axes extending at substantially right angles to the axes of the rollers —15— and —20—, one side of the belt —25— being disposed flatwise relatively to and in close proximity to the edges of the belts —19—.

The recording finger —2— preferably consists of a tube having one end attached to an ink reservoir —30— on the side of the belt —25— opposite to that to which the ledge —24— is secured, the recording finger —2— being in the form of a stylus to convey the ink to the surface of the recording cylinder —1— upon which the finger —2— bears.

The ledge —24— is secured to the normal upper end of one side of the belt —25— while the reservoir —30— is secured to the normal lower end of the opposite side and serves as a counterweight to return the belt —25— to its normal position.

The ledge —24— on the outer side of the belt —25— projects into the path of movement of and is alternately engaged by the shoulders —23— of the belts —19— and when one of the rollers 15— and its belt —19— are brought into contact with the driving roller 14—, said belt 19— is actuated and transmits similar motion to the belt —25— and recording finger —2— at a speed proportionate to the speed of the initial driving element —A— such motion continuing through a period of in this instance, one minute, during which the recording finger or stylus —2— moves along and upon the surface of the recording cylinder —1—, thereby producing a line of a certain length according to the speed of movement of the actuating member —A— during the interval of, in this instance, one minute. At the end of each period of time one roller —15— is automatically and instantly shifted to bring the other roller —15— into contact with the driving roller —14— allowing the previously actuated belt —19— to return to its normal position and at the same time permit the belt —25— to return to a greater or less degree to its starting position. It is evident, however, that the return movement of the belt —25— takes place during the interval of time between the shifts of the rollers —15— and belts —19— and the meeting of the shoulder —23— and returning ledge —24— but the complete return movement of this belt —25— is quite immaterial owing to the fact that the upper ends of the line only are of service in obtaining the average consumption of electric energy or the average speeds of revolution of the driving element for given periods of time.

The means for shifting the rollers —15— and belts —19— alternately into engagement with the opposite faces of the driving roller —14— preferably consists of a pair of solenoids or electromagnets —33— having their plungers connected by rods —34— to opposite sides of the upper end of the oscillatory frame —17—, the winding of said solenoids being electrically connected to a source of electric energy, as a battery —31—.

The solenoids are connected in separate circuits deriving current from the same source as the battery —31— and having terminal brushes —35— which bear upon diametrically opposite faces of a rotary commutator —36— having a single contact terminal —37— common to both circuits.

The commutator —36— is in this instance rotated one complete revolution every two minutes through the medium of gears —38— which are driven by the chronometer —6— so that the solenoids —33— are alternately energized every minute, or at each half revolution of the commutator —36—.

It is now clear that when the contact terminal —37— of the commutator is in contact with one of the brushes —35—, as shown in Fig. 1, the corresponding solenoid —33— is energized and operates the oscillating element —17— in one direction to force one of the rollers —15— and its belt —19— into contact with the continuously rotating driving roller —14—, whereupon linear motion is immediately imparted to the belt —19— causing the shoulder —23— to engage the ledge —24— and operate the belt —25— and recording finger —2— carried thereby, the recording finger continuing its movement along the record cylinder —1— until the contact piece —37— establishes electrical connection with the other brush —35—, whereupon the opposite solenoid is energized and immediately operates to shift the oscillating frame —17— in the opposite direction, thereby bringing the other roller —15— and its belt —19— into engagement with the driving roller —14— and allowing the first named belt —19— to return to its starting position by means of its counterweight —22—.

As the frame —17— is shifted in opposite directions it is held in its adjusted position by a suitable spring detent —40— bearing upon a V-shaped lug —41—, as best seen in Fig. 1, said spring being tensioned upwardly to exert additional pressure upon the roller —15— and its belt —19— against the driving roller —14—, thereby establishing a more positive drive for the belts —19— and —25—.

The gears —38— and commutator —36— are shown as driven from the second hand spindle as —44— of a clock-mechanism but it is obvious that any other chronometer controlled mechanism may be employed to alternately open and close the circuits in which the electric switch operating devices are connected.

In Fig. 4, I have shown a modified form of marker consisting of a spring retracted puncturing, marking or indenting finger —45— which is normally held a slight distance away from the record receiving drum —1— by spring —46— on the belt —25—.

The marker finger —45— is substituted for the recording finger —2— shown in Figs. 1, 2 and 3 and is actuated by the belt —25— along the cylinder —1— in the same manner except that it does not contact with or make an impression upon said cylinder until it reaches the limit of each up stroke whereupon it is automatically forced into engagement with the record cylinder by electrical energized means as the plunger of a solenoid —48— which is connected in the switch between the battery —31— and commutator —36—, said plunger having a vertically elongated bar —48′— which extends along one side of the cylinder so as to engage and operate the marker —45— in any position.

In Fig. 5 I have shown a cylinder —1— as provided with a series of records in the form of dots or visible impressions —50— which have been made by the finger —45— such dots may be connected by a transverse line as shown thus producing a chart which gives a graphic record of the average rates of consumption of electric energy or kilowatt hours for predetermined periods as one minute of time.

The operation of this particular device, briefly described, is as follows; At the beginning of a minute one of the belts —19— is thrown into contact with the continuously rotating driving element —14— by means of its solenoid —33— which is energized every second minute through the medium of a chronometer controlled switch as one of the terminals —35— and the terminal —37— of the commutator —36—. This causes the actuated belt —19— and the shoulder —23— to move at the same proportionate speed as the main driving element or meter shaft —A—, the shoulder —23— engaging the ledge —24— and thereby imparting to the belt —25— the same speed of movement which in turn elevates the recording finger —2— or —45— as the case may be along the record cylinder —1—. At the end of the minute the other solenoid —33— is energized by the action of the commutator —36— to shift the other belt —19— into operative engagement with the continuously rotating roller —14—, at the same time throwing the first named belt —19— out of action. Following this shift the belt —25— and recording finger —2— thereon return toward their starting position thus bringing the ledge —24— upwardly until it meets the now downwardly moving shoulder —23— on the moving belt —19—. As soon as the shoulder —23— meets the ledge —24— the belt —25— again elevates the recording finger —2— or —45— as the case may be along the cylinder —1— which is continuously shifting its position, said recording finger leaving an impression upon the record cylinder during or at the end of each upward stroke, or rather during or at the end of each minute, the height to which said recording finger moves during each minute period depending upon the average speed of rotation or the number of revolutions of the main driving member —A— during that minute period.

What I claim is:

1. A recording wattmeter comprising integrating wattmeter mechanism for measuring and registering the consumption of electric energy, means for forming a record corresponding with the integrations of said mechanism, a time keeping mechanism combined with means for operating said recording mechanism by said time keeping mechanism, said means comprising an electric circuit and a circuit closing device therein actuated by the time keeping mechanism.

2. A recording electricity meter comprising integrating electricity meter mechanism for measuring and registering the consumption of electric current, means for automatically providing a record corresponding with the integrations of said mechanism, operating mechanism for periodically operating said means, time keeping mechanism combined with said operating mechanism, to automatically actuate said means at predetermined times through the agency of electrical devices and the electrical devices aforesaid, said electrical devices consisting of a timewheel provided with the periodic circuit closing apparatus.

3. In combination, an integrating electricity meter responsive to the duration and strength of an electric current passing through the meter, a movable recording element, connections between a movable element of the electricity meter and said recording element for actuating the latter at a speed proportionate to that of the moving element of the electricity meter, electromagnetic mechanism adapted when actuated to cause the recording element to record its position, and a chronometer controlling the energization of said electromagnetic mechanism.

4. In combination, an integrating electricity meter comprising revolving mechanism responsive to the duration and strength of an electric current passing through the meter and a register driven by the revolving mechanism, a platen carrying a record sheet, a recording element movable relative to the platen, means actuated by a revolving element of the meter to move the recording element in one direction, electromagnetic mechanism adapted upon actuation to cause the recording element to mark its position upon the record sheet carried by said platen, and a chronometer controlling the energization of said electromagnetic mechanism.

5. In combination with a revolving element, a chronometer rotated cylinder, a recording device movable along said cylinder, separate actuating devices for moving the recording device in one direction along said cylinder, and chronometer controlled means for alternately throwing said actuating devices into connection with the revolving element at regular predetermined intervals of time, each of said actuating devices having means for returning it toward its starting position at the ends of the intervals of time.

6. In a recording device for integrating wattmeters, a chronometer rotated platen, a recording device movable along said platen, separate actuating devices for moving the recording device in one direction, a meter rotated member, and chronometer-controlled means for alternately moving said separate actuating devices into and out of operative connection with said member.

7. In an electrical measuring instrument, the combination with means for registering and indicating directly the total amount of power that traverses a given circuit during a given interval of time, of means for recording the maximum amounts of power that traverse said circuit during each of a plurality of given intervals of time.

8. A recording wattmeter, comprising watt measuring and integrating mechanism, recording mechanism and a separate timekeeping mechanism, in combination with electrically operated means whereby said time-keeping mechanism causes the actuation of said recording mechanism at predetermined periods of time.

9. A recording wattmeter comprising integrating wattmeter mechanism, means for automatically providing a record of the integrations of said mechanism, operating mechanism for periodically operating said means, time-keeping mechanism combined with said operating mechanism to automatically actuate said means at predetermined times by said time-keeping mechanism through the agency of electrical devices, and the electrical devices aforesaid, said electrical devices consisting of a time wheel provided with periodic circuit-closing apparatus.

10. A recording wattmeter, comprising watt measuring and integrating mechanism, recording mechanism, and a separate time-keeping mechanism in combination with means coöperating with the time-keeping mechanism whereby said time-keeping mechanism causes the actuation of the said recording mechanism at predetermined periods of time to produce a chronological record of the consumption of electrical energy.

11. A recording electricity meter, comprising electricity measuring and integrating mechanism, a recording device, time-keeping mechanism and electrically operated means coöperating with the time-keeping mechanism to record time intervals of considerable duration and the corresponding amounts of metered electricity.

12. A recording wattmeter comprising watt measuring and integrating mechanism, recording mechanism and a separate time-keeping mechanism in combination with actuating mechanism whereby said time-keeping mechanism causes the actuation of said recording mechanism at predetermined periods of time.

In witness whereof I have hereunto set my hand this 25th day of September 1906.

SIMON B. STORER.

Witnesses:
MILDRED M. NOTT,
H. E. CHASE.